United States Patent
Murayama et al.

(10) Patent No.: US 11,105,737 B2
(45) Date of Patent: Aug. 31, 2021

(54) SPECTROSCOPIC ANALYSIS DEVICE

(71) Applicant: YOKOGAWA ELECTRIC CORPORATION, Musashino (JP)

(72) Inventors: Kodai Murayama, Musashino (JP); Hiroyuki Sugino, Musashino (JP); Fumie Watanabe, Musashino (JP); Atsushi Ito, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 16/762,772

(22) PCT Filed: Oct. 24, 2018

(86) PCT No.: PCT/JP2018/039532
§ 371 (c)(1),
(2) Date: May 8, 2020

(87) PCT Pub. No.: WO2019/093128
PCT Pub. Date: May 16, 2019

(65) Prior Publication Data
US 2021/0190681 A1 Jun. 24, 2021

(30) Foreign Application Priority Data
Nov. 10, 2017 (JP) .............................. JP2017-217100

(51) Int. Cl.
*G01N 21/35* (2014.01)
*G02B 5/04* (2006.01)

(52) U.S. Cl.
CPC ............... *G01N 21/35* (2013.01); *G02B 5/04* (2013.01); *G01N 2201/0635* (2013.01); *G01N 2201/0638* (2013.01)

(58) Field of Classification Search
CPC .............................. G01N 21/553; G01N 21/21
See application file for complete search history.

(56) References Cited

U.S. PATENT DOCUMENTS

| 4,166,697 A | 9/1979 | Ito et al. |
| 6,075,647 A | 6/2000 | Braub et al. |
| (Continued) | | |

FOREIGN PATENT DOCUMENTS

| JP | 53-43592 A | 4/1978 |
| JP | 7-159319 A | 6/1995 |
| (Continued) | | |

OTHER PUBLICATIONS

Ikehata, Akifumi et al., "High sensitive detection of near-infrared absorption by surface plasmon resonance", Applied Physics Letters, vol. 83, No. 11, Sep. 15, 2003, pp. 2232-2234. (4 pages total).

(Continued)

*Primary Examiner* — Yara B Green
(74) *Attorney, Agent, or Firm* — Sughrue Mion, PLLC (57) ABSTRACT

A spectroscopic analysis device includes: a light source configured to emit light for irradiating a specimen; a prism stuck to the specimen and configured to totally reflect the light emitted from the light source; a polarizing separation element configured to separate the light totally reflected by the prism into a first and second polarized light components that are orthogonal to each other; a wavelength dispersing element configured to disperse respective wavelength components of the first and second polarized light components that are separated by the polarizing separation element; an image capturing element configured to capture respective images of the first and second polarized light components that are dispersed by the wavelength dispersing element; and a processing unit configured to perform component analysis on the specimen by obtaining an absorbency at each wavelength by using an imaging signal output from the image capturing element.

5 Claims, 6 Drawing Sheets

(56) References Cited

U.S. PATENT DOCUMENTS

| | | | |
|---|---|---|---|
| 2010/0067015 A1* | 3/2010 | Matsushita | G01J 3/0256 356/445 |
| 2011/0063617 A1* | 3/2011 | Takahashi | G01N 21/19 356/370 |
| 2012/0069336 A1 | 3/2012 | Rakitzis | |
| 2016/0178515 A1 | 6/2016 | Li et al. | |
| 2016/0313246 A1* | 10/2016 | Wong | G01N 21/553 |

FOREIGN PATENT DOCUMENTS

| | | |
|---|---|---|
| JP | 11-271679 A | 10/1999 |
| JP | 2002-286632 A | 10/2002 |
| JP | 2009-74833 A | 4/2009 |
| JP | 2011-220889 A | 11/2011 |
| JP | 2015-64205 A | 4/2015 |
| WO | 2009/137122 A2 | 11/2009 |

OTHER PUBLICATIONS

International Search Report (PCT/ISA/210) dated Jan. 22, 2019 by the International Searching Authority in counterpart International Patent Application No. PCT/JP2018/039532.

International Search Report (PCT/ISA/237) dated Jan. 22, 2019 by the International Searching Authority in counterpart International Patent Application No. PCT/JP2018/039532.

Communication dated Jul. 1, 2021 issued by the European Intellectual Property Office in counterpart European Application No. 18876449.2.

J. D. Swalen et al., "Plasmon surface polariton dispersion by direct optical observation", American Journal of Physics, vol. 48, No. 8, American Association of Physics Teachers, Aug. 1980, pp. 669-672, 4 pages total, XP008036505.

* cited by examiner

SPECTROSCOPIC ANALYSIS DEVICE

TECHNICAL FIELD

The present invention relates to a spectroscopic analysis device.

BACKGROUND ART

As a method of analyzing each component amount in a very small amount of specimen, a method of measuring a reflection absorption spectrum and performing component analysis on a target is suggested. In order to analyze each component amount in the very small amount of specimen, an attenuated total reflection (ATR) is generally performed in which the specimen is stuck to an optical prism, light is incident from an end of the optical prism and is totally reflected at a threshold angle or greater, and the light emitted light from the optical prism is measured. According to the ATR, when totally reflecting the light, an optical signal generates an evanescent wave on a surface of the optical prism. By using the evanescent wave, an absorption spectrum of the specimen is obtained.

However, since the evanescent wave exists only on the extreme surface of the optical prism, an amount of light transmitting through the specimen is small and the absorbency of the specimen is low. For this reason, a method of exciting and resonating free electrons in metal by light and enhancing the absorption spectrum intensity is suggested (for example, refer to NPL 1).

Figure 7:
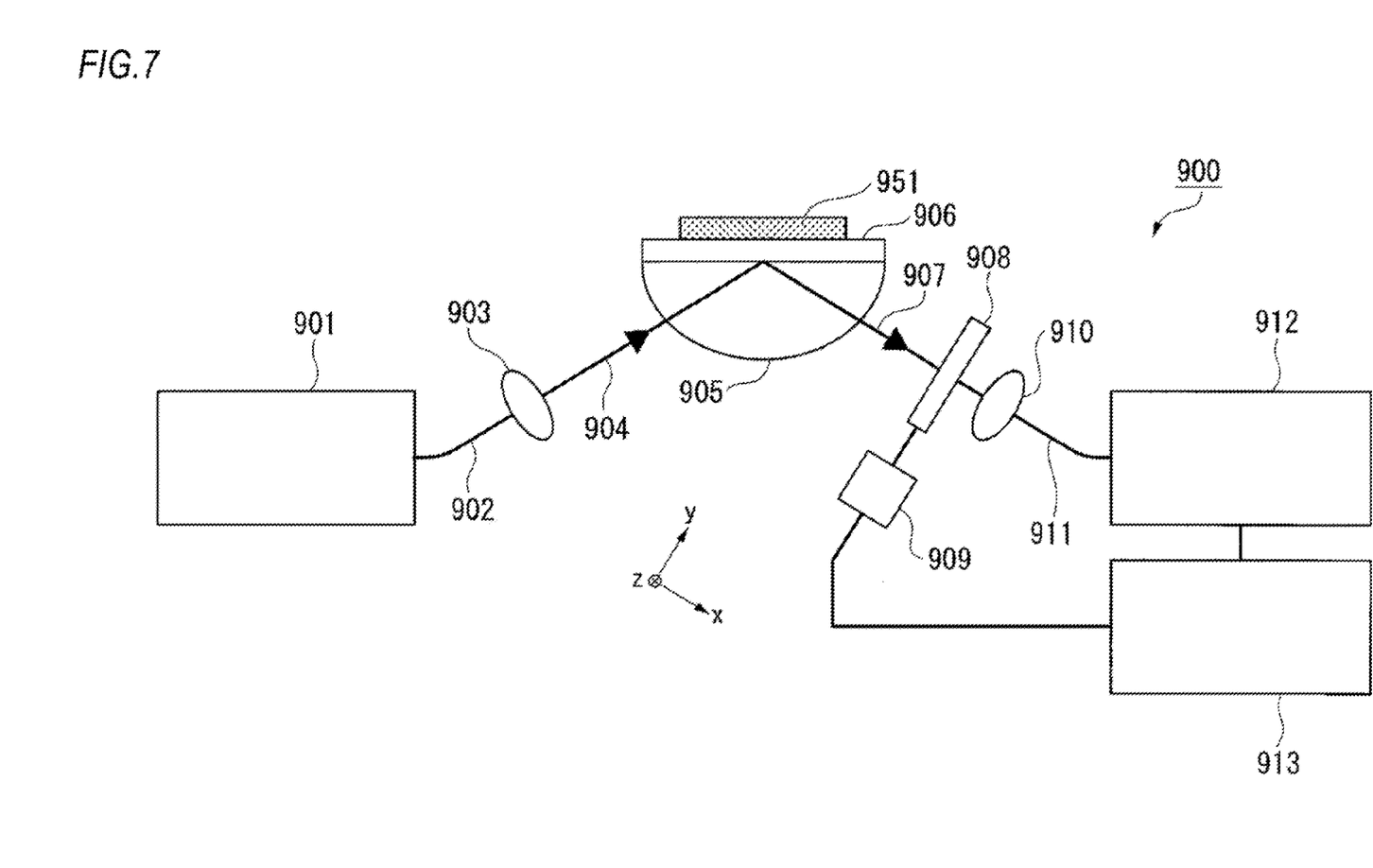
FIG. 7 depicts a configuration of a spectroscopic analysis device in accordance with the related art.

In order to perform the analysis disclosed in NPL 1, a spectroscopic analysis device 900 as shown in FIG. 7 is used, for example. FIG. 7 illustrates a configuration of the spectroscopic analysis device 900 in accordance with the related art. A liquid phase specimen 951 that is an analysis target is put on a metal thin film 906.

As illustrated in FIG. 7, the spectroscopic analysis device 900 includes a light source 901, a light guiding unit 902, a collimating unit 903, a prism substrate 905, a metal thin film 906, a polarizer 908, a polarizer rotating mechanism 909, a condensing unit 910, a light guiding unit 911, a spectroscope 912, and a processing unit 913. The light guiding unit 902 and the light guiding unit 911 are optical fibers. The collimating unit 903 is a lens, and is configured to convert light emitted from the light guiding unit 902 into collimated light. The prism substrate 905 is a half-spherical prism. The polarizer 908 is a polarizing element for polarizing reflected light from the prism substrate 905. The polarizer rotating mechanism 909 is configured to rotate the polarizer 908, in response to control of the processing unit 913. The polarizer rotating mechanism 909 includes, for example, a bearing, a gear, a motor and the like. The condensing unit 910 is a lens, and is configured to condense light emitted from the polarizer 908 into the light guiding unit 911. The spectroscope 912 is configured to disperse light emitted from the light guiding unit 911. The processing unit 913 is configured to perform spectrum analysis on dispersed light output from the spectroscope 912.

In the method disclosed in NPL 1, light 904 emitted from the wideband light source 901 is caused to be incident on the prism substrate 905 to which the metal thin film 906 is bonded. The light totally reflected and emitted on a prism interface passes through the polarizer 908 adjusted to cut polarized light in a horizontal direction with respect to the prism interface or polarized light in a vertical direction with respect to the prism interface, and is then incident on the spectroscope 912. While the polarized light (p-polarized light) in the vertical direction with respect to the prism interface generates an evanescent wave, the polarized light (s-polarized light) in the horizontal direction with respect to the prism interface is totally reflected on an interface of the metal thin film 906 and does not generate an evanescent wave. Therefore, when a polarization azimuth angle is switched between 0° and 90° by rotating the polarizer 908, acquisitions of absorbed reflected light and non-absorbed reflected light can be switched. The processing unit 913 can obtain an absorption spectrum by calculating a difference of reflected light information of the two components. By the configuration, it is possible to analyze each component amount in the very small amount of specimen.

CITATION LIST

Non-Patent Literature

[NPL 1] 'High sensitive detection of near-infrared absorption by surface plasmon resonance', Akifumi Ikehata, Xiaoling Li, Tanitake Itoh, Yukihiro Ozakia, American Institute of Physic, VOLUME 83, NUMBER 11, 2003, p 2232-2234

SUMMARY OF INVENTION

Technical Problem

However, according to the technique disclosed in NPL 1, since it is necessary to acquire the reflected light two times (p-polarized light and s-polarized light) in time series, it takes time to perform the measurement, so that light using efficiency (throughput) decreases. Also, according to the technique disclosed in NPL 1, the polarizer rotating mechanism 909 configured to rotate the polarizer 908 is provided, which enlarges the device configuration. Also, according to the technique disclosed in NPL 1, since it is not possible to acquire the absorbed reflected light and the non-absorbed reflected light at the same time, it is not possible to cancel instability of the light source.

The present invention has been made in view of the above situations, and an object thereof is to provide a spectroscopic analysis device that is capable of performing component analysis on a liquid phase more rapidly and is more compact and more stable.

Solution to Problem

To achieve the above-mentioned object, a spectroscopic analysis device (100) related to one aspect of the present invention is configured to perform component analysis on a specimen (51) by means of a reflection absorption spectrum of reflected light obtained by irradiating the specimen with light. The spectroscopic analysis device includes: a light source (1) configured to emit light for irradiating the specimen; a prism (prism substrate 5, metal thin film 6) stuck to the specimen and configured to totally reflect the light emitted from the light source; a polarizing separation element (8) configured to separate the light totally reflected by the prism into a first polarized light component (for example, 0° polarized light component, s-polarized light component) and a second polarized light component (for example, 90° polarized light component, p-polarized light component) that are orthogonal to each other; a wavelength dispersing element (11) configured to disperse respective wavelength components of the first polarized light component and the second polarized light component that are separated by the polarizing separation element; an image capturing element (12) configured to capture respective images of the first polarized light component and the second polarized light component that are dispersed by the wavelength dispersing element; and a processing unit (13) configured to perform component analysis on the specimen by obtaining an absorbency at each wavelength by using an imaging signal output from the image capturing element.

The spectroscopic analysis device related to one aspect of the present invention may further include: a trigonal prism (9) between the polarizing separation element and the wavelength dispersing element, and configured to convert the first polarized light component and the second polarized light component that are separated by the polarizing separation element into collimated lights, and a slit (10) between the trigonal prism and the wavelength dispersing element, and configured to transmit therethrough components of the collimated lights of the first polarized light component and the second polarized light component that are converted into the collimated lights by the trigonal prism to guide to the wavelength dispersing element.

In the spectroscopic analysis device related to one aspect of the present invention, a grating angle of the wavelength dispersing element may be set to an angle at which both efficiencies of the first polarized light component and the second polarized light component are to be the same.

To achieve the above-mentioned object, a spectroscopic analysis device (100A) related to one aspect of the present invention is configured to perform component analysis on a specimen (51) by means of a reflection absorption spectrum of reflected light obtained by irradiating the specimen with light. The spectroscopic analysis device includes: a light source (1) configured to emit light for irradiating the specimen; a prism (prism substrate 5, metal thin film 6) stuck to the specimen and configured to totally reflect the light emitted from the light source; a polarizing separation element (16) configured to separate the light totally reflected by the prism into a first polarized light component (for example, 0° polarized light component, s-polarized light component) and a second polarized light component (for example, 90° polarized light component, p-polarized light component) orthogonal to each other, the polarizing separation element being a Savart plate having birefringent crystals laminated thereto; a wave plate (17) configured to convert one of the first polarized light component and the second polarized light component that are separated by the polarizing separation element into a third polarized light component of which a polarization direction is rotated by 90°; an (for example, 0° polarized light component (s-polarized light component) obtained by rotating the polarization direction of the 90° polarized light component by 90° or 90° polarized light component (p-polarized light component) obtained by rotating the polarization direction of the 0° polarized light component by 90°) interference unit (condensing unit 18) configured to cause the other of the first polarized light component and the second polarized light component to interfere with the third polarized light component to interfere with each other; an image capturing element (12) configured to capture an image of an interference fringe obtained as a result of interference; and a processing unit (13) configured to perform component analysis on the specimen by obtaining an absorbency at each wavelength by using an imaging signal output from the image capturing element.

In the spectroscopic analysis device related to one aspect of the present invention, the polarizing separation element, the wave plate and interference unit may be stuck to each other.

Advantageous Effects of Invention

According to the present invention, it is possible to provide the spectroscopic analysis device that is capable of performing component analysis on a liquid phase more rapidly and is more compact and more stable.

DESCRIPTION OF EMBODIMENTS

Hereinafter, embodiments of the present invention will be described with reference to the drawings. In the respective drawings to be used for descriptions below, a scale of each member is appropriately changed so that each member can be recognized.

First Embodiment

Figure 1:
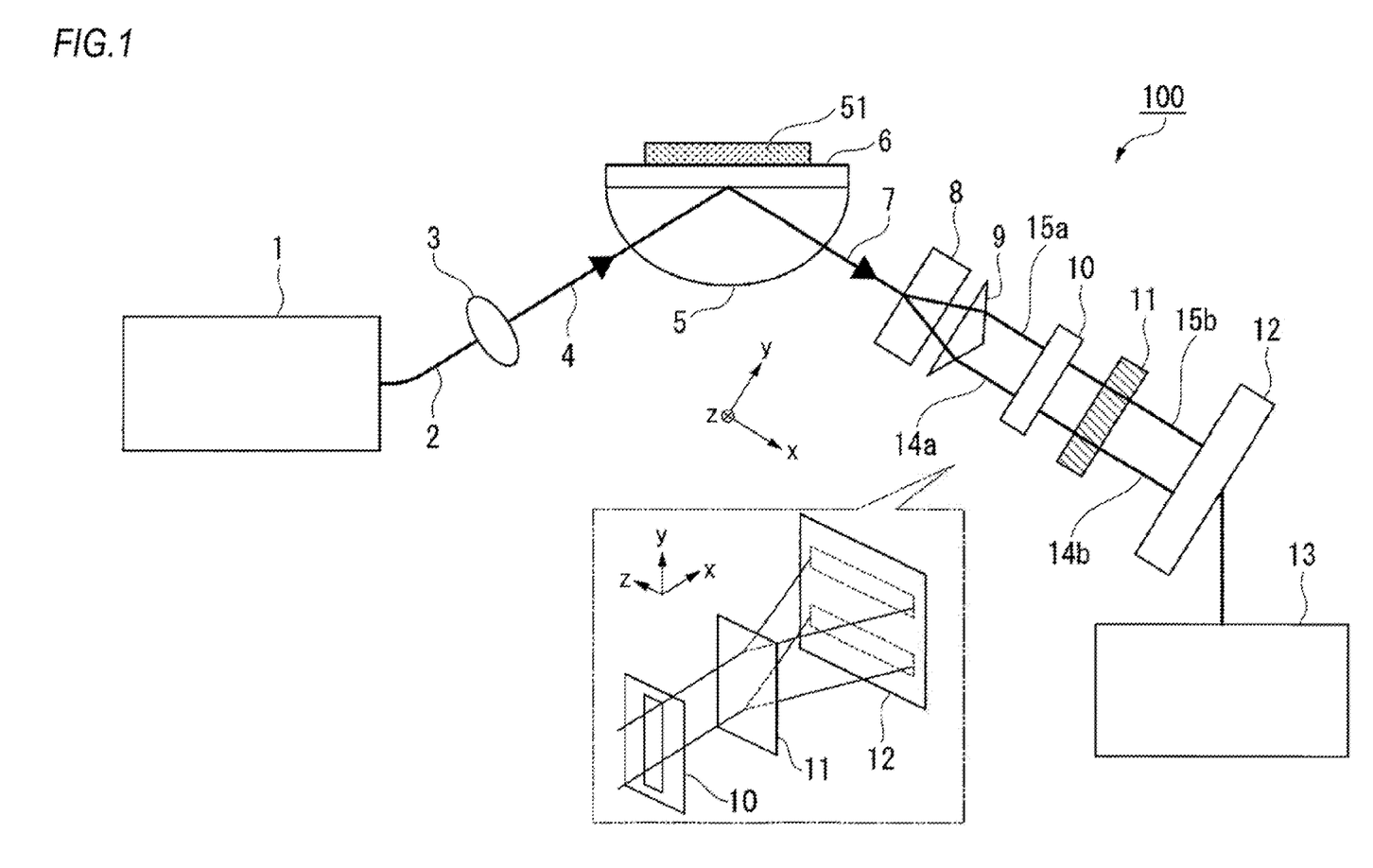
FIG. 1 depicts an example of a configuration of a spectroscopic analysis device in accordance with a first embodiment.

FIG. 1 depicts an example of a configuration of a spectroscopic analysis device in accordance with a first embodiment. As shown in FIG. 1, a spectroscopic analysis device 100 includes a light source 1, a light guiding unit 2, a collimating unit 3, a prism substrate 5, a metal thin film 6, a polarizing separation element 8, a trigonal prism 9, a slit 10, a wavelength dispersing element 11, an image capturing element 12, and a processing unit 13. In the meantime, a liquid phase specimen 51, which is an analysis target, is put on the metal thin film 6.

Also, in FIG. 1, an optical axis of emitted light 7 from the prism substrate 5 is referred to as 'x-axis direction', a direction perpendicular to the x-axis direction is referred to as 'y-axis direction', and a depth direction of the xy plane is referred to as 'z-axis direction'.

In the first embodiment, each component amount in a very small amount of specimen is analyzed using an attenuated total reflection (ATR).

The light source 1 is a light source of a wavelength corresponding to the specimen to be analyzed, and is, for example, a wideband light source or a light source configured to emit infrared light.

The light guiding unit 2 is, for example, an optical fiber.

The collimating unit 3 is a unit for converting light emitted from the light guiding unit 2 into collimated light, and is, for example, a lens or mirror. In the meantime, an angle of a light beam to be incident on the prism substrate 5 from the collimating unit 3 is an angle at which the light is to be totally reflected on a prism interface.

The prism substrate 5 is, for example, a cylindrical or half-spherical prism. The metal thin film 6 is bonded to the prism substrate 5. The collimated light emitted from the collimating unit 3 is incident, as incident light 4, on the prism substrate 5. Also, the prism substrate 5 emits emitted light 7 totally reflected on the prism interface. In the meantime, the emitted light 7 has a 0° polarized light component (s-polarized light component; first polarized light component) and a 90° polarized light (p-polarized light component; second polarized light component).

The metal thin film 6 is a metal thin film of gold, silver, copper or the like, for example.

The polarizing separation element 8 is a birefringence element of which an optical axis is adjusted so as to separate the 0° polarized light component and the 90° polarized light of the emitted light, and is, for example, a Wollaston prism. The polarizing separation element 8 is configured to emit each of the separated 0° polarized light component and 90° polarized light at predetermined angles.

The 0° polarized light component and 90° polarized light emitted from the polarizing separation element 8 are incident on the trigonal prism 9. The trigonal prism 9 is configured to convert the incident 0° polarized light component and 90° polarized light into collimated lights and to emit the collimated lights. A reference sign 14a indicates the emitted light of the 0° polarized light component, i.e., s-polarized light. A reference sign 15a indicates the emitted light of the 90° polarized light component, i.e., p-polarized light.

The slit 10 has, for example, a rectangular hole on the yz plane. The slit 10 is configured to guide only respective collimated light components of the 0° polarized light component and the 90° polarized light incident from the trigonal prism 9 to the wavelength dispersing element 11. The reason to introduce the slit 10 is to obtain a resolution necessary for the wavelength dispersing element 11. In the meantime, a configuration example of the slit 10 will be described later.

The wavelength dispersing element 11 is an element configured to disperse a wavelength by a diffraction grating. The wavelength dispersing element 11 is configured to disperse wavelengths of transmitted lights of each of the 0° polarized light component and the 90° polarized light component incident from the slit 10 and to emit the same to the image capturing element 12. Efficiencies of the 0° polarized light component and the 90° polarized light component are changed by a grating angle. For this reason, in the first embodiment, in order to correct the change in efficiency, the grating angle is set with being tilted (rotated) by 45° with respect to the 0° polarized light component and the 90° polarized light component. That is, the grating angle is tilted by 45°, so that it is tilted by 45° with respect to both the 0° polarized light component and the 90° polarized light component. Therefore, both efficiencies of the 0° polarized light component and the 90° polarized light component are made to be the same. In the meantime, the efficiency on the 0° polarized light component and the 90° polarized light component changes depending on the number of gratings, a shape of the grating and the like of the wavelength dispersing element 11 to be used. Therefore, the grating angle is set to an angle at which both efficiencies of the 0° polarized light component and the 90° polarized light component are to be the same according to the wavelength dispersing element 11 to be used.

The image capturing element 12 is, for example, an image capturing element such as a two-dimensional CCD (Colony Collapse Disorder; charge-coupled device) and a two-dimensional CMOS (Complementary MOS). The image capturing element 12 is configured to output optical signals of each of the captured 0° polarized light component and 90° polarized light component to the processing unit 13. In the meantime, the image capturing element 12 is arranged in conformity to the grating angle of the wavelength dispersing element 11.

The processing unit 13 is configured to convert the optical signals of each of the 0° polarized light component and the 90° polarized light component output from the image capturing element 12 into an absorbency at each wavelength X by using an expression (1).

[Expression 1]

$$\text{Absorbency}(\lambda) = \log \frac{90° \text{ polarized light component}(\lambda)}{0° \text{ polarized light component}(\lambda)} \quad (1)$$

The processing unit 13 is configured to perform component analysis on the specimen by a well-known method (absorption spectroscopic method), based on the absorbency at each wavelength λ.

Figure 2A:
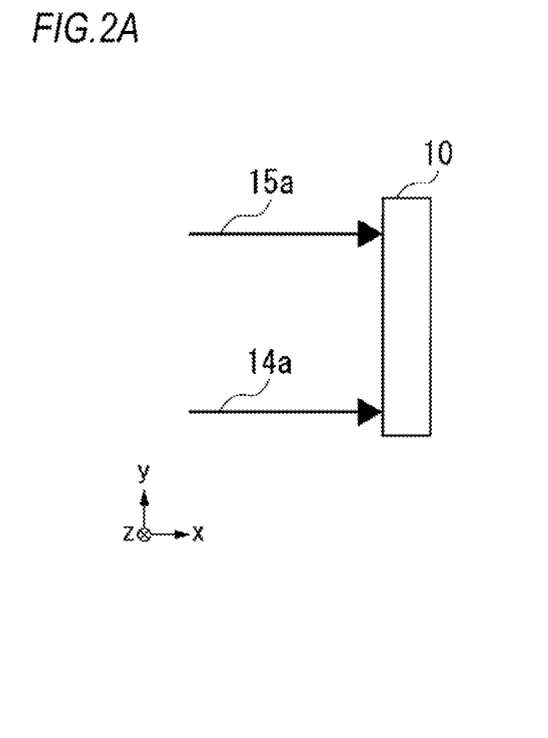
FIG. 2A is a plan view of a slit on an xy plane in the first embodiment.
Figure 2B:
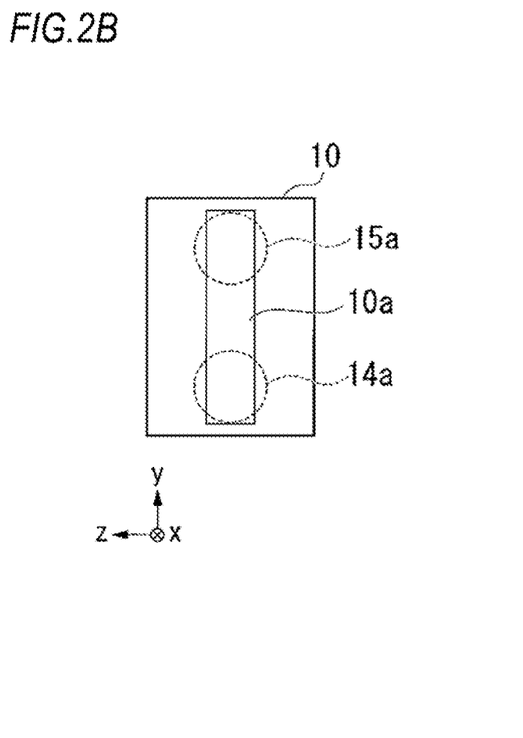
FIG. 2B is a plan view of the slit on a yz plane in the first embodiment.

Subsequently, the slit 10 is described.

FIG. 2A is a plan view of the slit 10 on the xy plane in the first embodiment, and FIG. 2B is a plan view of the slit 10 on the yz plane in the first embodiment.

As shown in FIG. 2B, the slit 10 has a rectangular hole 10a having a long side in the y-axis direction and a short side in the z-axis direction. As shown in FIGS. 2A and 2B, the light (p-polarized light) 15a of the 90° polarized light component is incident in the vicinity of one end of the rectangular hole 10a in the y-axis direction, and the light (s-polarized light) 14a of the 0° polarized light component is incident in the vicinity of the other end of the rectangular hole 10a in the y-axis direction.

In the meantime, a width of the rectangular hole 10a in the z-axis direction is narrowed when increasing the resolution, and is widened when decreasing the resolution.

Figure 3:
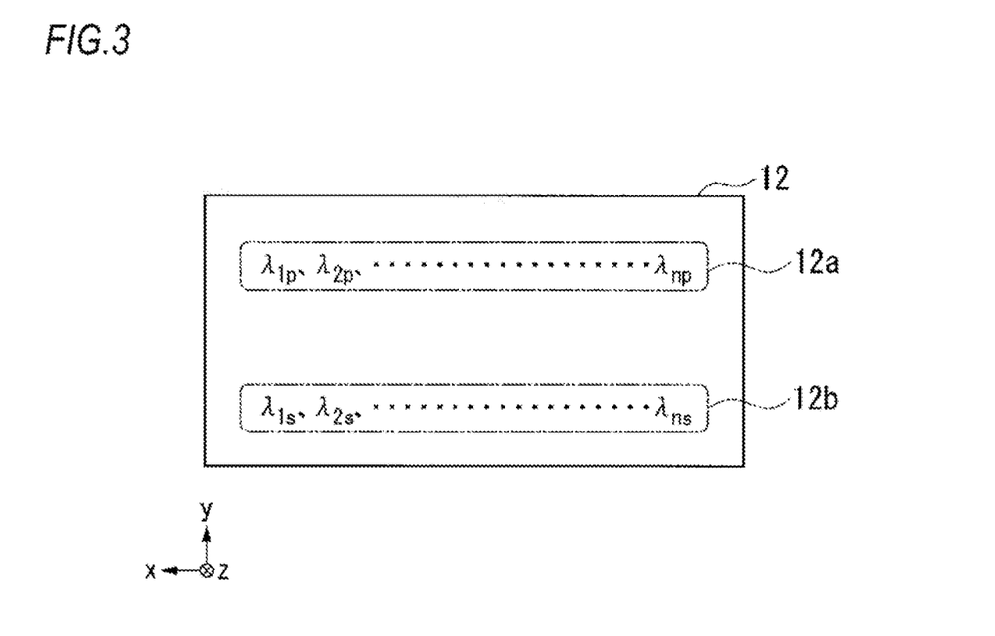
FIG. 3 depicts an example of an image formed on an image capturing element of the first embodiment.

Subsequently, an example of an image formed on the image capturing element 12 is described.

FIG. 3 depicts an example of an image formed on the image capturing element 12 of the first embodiment.

An area denoted by a reference sign 12a is an image formed by the light (p-polarized light) 15a of the 90° polarized light component, and each component of wavelength A (n: an integer of 1 or greater) forms an image in order of $\lambda_{1p}, \lambda_{2p}, \ldots, \lambda_{np}$ the z-axis direction.

An area denoted by a reference sign 12b is an image formed by the light (s-polarized light) 14a of the 0° polarized light component, and each component of wavelength 4 forms an image in order of $\lambda_{1s}, \lambda_{2s}, \ldots, \lambda_{ns}$ in the z-axis direction.

In this way, in the first embodiment, the light (p-polarized light) of the 90° polarized light component and the light (s-polarized light) of the 0° polarized light component are emitted coaxially and in parallel by using the polarizing separation element 8, which are detected by one image capturing element 12. Thereby, in the first embodiment, the p-polarized light and the s-polarized light can be detected at the same time. As a result, according to the first embodiment, since the p-polarized light and the s-polarized light can be detected at the same time, the light using efficiency (throughput) can be doubled, as compared to the related art in which the p-polarized light and the s-polarized light are detected at different times. Herein, according to the related art in which the lights are not coaxial and parallel, it is necessary to provide two image capturing elements, and to individually adjust alignment. In contrast, according to the first embodiment, since the lights are separated coaxially and in parallel, the p-polarized light and the s-polarized light can be detected at the same time by one image capturing element, so that the alignment adjustment has only to be performed once. Thereby, according to the first embodiment, it is possible to significantly reduce the cost relating to the alignment adjustment, as compared to the related an.

In the meantime, the processing unit 13 obtains an absorptivity at the wavelength $\lambda_1$, for example, by substituting the 90° polarized light component ($\lambda_{1p}$) and the 0° polarized light component ($\lambda_{1s}$) into the expression (1).

In the above embodiment, the two-dimensional image capturing element in which the image capturing element 12 is one has been exemplified. However, the present invention is not limited thereto. The image capturing element 12 may include one-dimensional first image capturing element configured to receive an image formed by the light (p-polarized light) 15a of the 90° polarized light component and one-dimensional second image capturing element configured to receive an image formed by the light (s-polarized light) 14a of the 0° polarized light component.

In the related art, the polarization azimuth angle of the light 907 emitted from the prism substrate 905 is switched between 0 and 90° by the polarizer 908 configured to rotate by the polarizer rotating mechanism 909, so that the absorbed reflected light and the non-absorbed reflected light are acquired.

In the first embodiment, the light 7 emitted from the prism substrate 5 is separated into the 0° polarized light component (s-polarized light component) and the 90° polarized light (p-polarized light component) by the polarizing separation element 8.

Also, in the first embodiment, the 0° polarized light component (s-polarized light component) and 90° polarized light (p-polarized light component) separated by the polarizing separation element 8 are converted into the collimated lights, which are then introduced into the wavelength dispersing element 11, via the trigonal prism 9 and the slit 10. In the first embodiment, the wavelength dispersing element 11 disperses the wavelengths of each of the collimated lights of the incident 0° polarized light component (s-polarized light component) and 90° polarized light (p-polarized light component) and then emits the same to the image capturing element 18.

Thereby, according to the first embodiment, since the 0° polarized light component (s-polarized light component) and the 90° polarized light (p-polarized light component) can be acquired at the same time with the image capturing element 12, the simultaneous measurement of the s-polarized light and the p-polarized light can be implemented. Also, according to the first embodiment, it is possible to increase the light using efficiency (throughput) by the simultaneous measurement. Also, according to the first embodiment, since the s-polarized light and the p-polarized light can be acquired at the same time, it is possible to cancel instability of the light source such as fluctuation.

Also, according to the first embodiment, since a moving unit is not provided, unlike the related art, it is possible to make the spectroscopic analysis device 100 smaller than the related art. According to the first embodiment, it is possible to reduce a size of an optical system to a half size of the related art, for example. Also, according to the first embodiment, since a moving unit is not provided, unlike the related art, it is possible to improve robustness, as compared to the related art.

The configuration of the spectroscopic analysis device 100 shown in FIG. 1 is just exemplary, and the present invention is not limited thereto. The spectroscopic analysis device 100 may not include the trigonal prism 9 and the slit 10.

Also, the wavelength dispersing element 11 may be a reflection type wavelength dispersing element. In this case, a signal can be obtained by changing the arrangement of the image capturing element 12 from the arrangement shown in FIG. 1.

Second Embodiment

Figure 4:
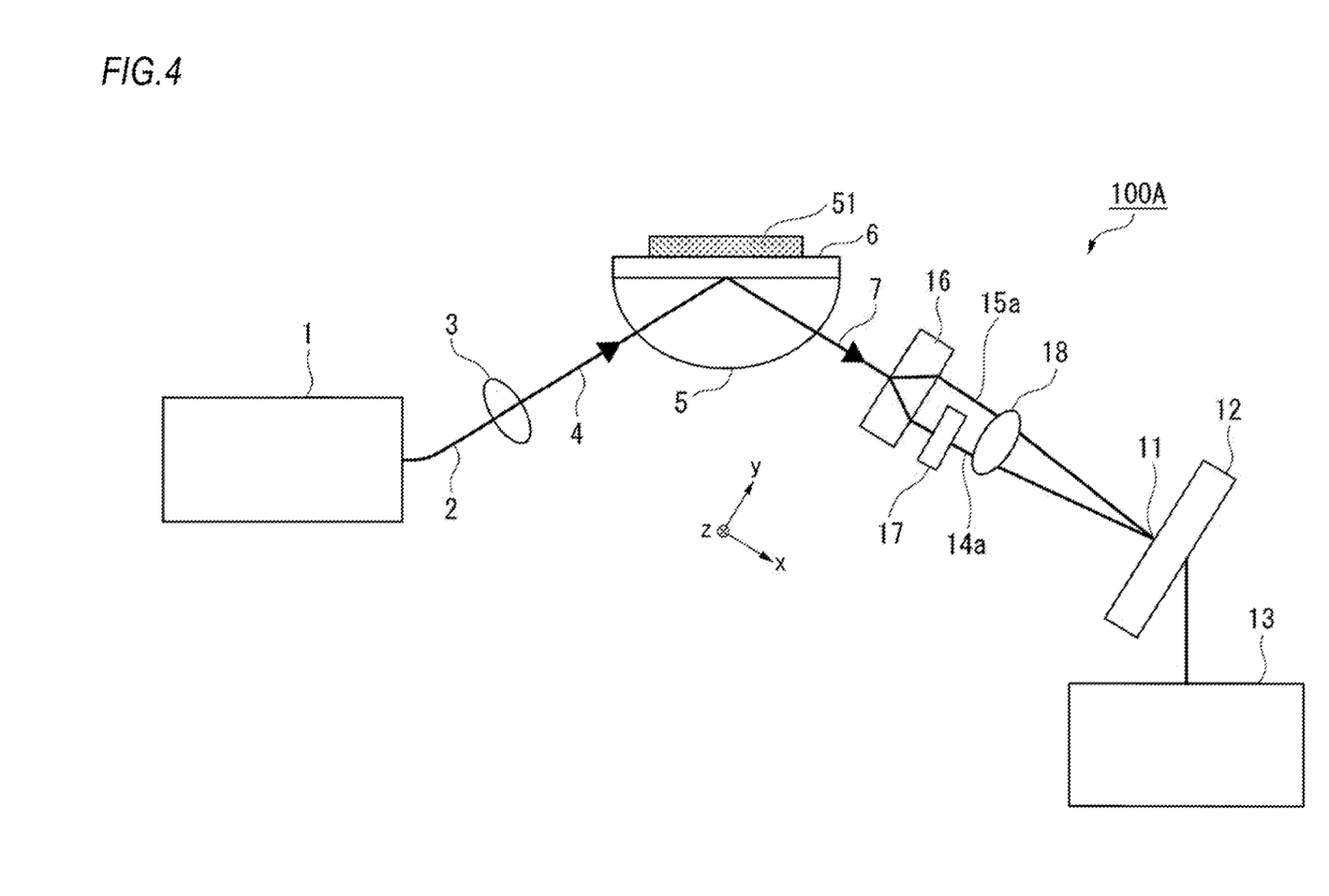
FIG. 4 depicts an example of a configuration of a spectroscopic analysis device in accordance with a second embodiment.

FIG. 4 depicts an example of a configuration of a spectroscopic analysis device 100A in accordance with a second embodiment. As shown in FIG. 4, the spectroscopic analysis device 100A includes a light source 1, a light guiding unit 2, a collimating unit 3, a prism substrate 5, a metal thin film 6, a polarizing separation element 16, a wave plate 17, a condensing unit 18 (interference unit), an image capturing element 12, and a processing unit 13. In the meantime, the constitutional elements having the same functions as those of the spectroscopic analysis device 100 are denoted with the same reference signs, and the descriptions thereof are omitted. Also, a liquid phase specimen 51 that is an analysis target is put on the metal thin film 6.

The polarizing separation element 16 is a Savart plate. The polarizing separation element 16 is a parallel planar crystal plate element having birefringence, for example, and is configured by bonding two birefringence plates each other. The polarizing separation element 16 is configured to separate light into a 0° polarized light component (s-polarized light component; first polarized light component) and a 90° polarized light component (p-polarized light component; second polarized light component) and to emit the separated 0° polarized light component and 90° polarized light component in parallel.

The 0° polarized light component (s-polarized light component) emitted from the polarizing separation element 16 is incident on the wave plate 17. The wave plate 17 is a half-wave plate configured to give a phase difference of $\lambda/2$ (=90°) to the incident 0° polarized light component (s-polarized light component). That is, the wave plate 17 is configured to rotate the polarized light component of the 0° polarized light component by 90°, thereby convening the same into the 90° polarized light component (third polarized light component). The wave plate 17 is configured to guide the light 14a of the 0° polarized light component converted into the 90° polarized light component to the condensing unit 18. In the meantime, the wave plate 17 may also be configured by using two quarter wave plates.

The condensing unit 18 is, for example, a convex lens. The light 15a of the 90° polarized light component (p-polarized light component) emitted from the polarizing separation element 16 and the light 14a of the 0° polarized light component converted into the 90° polarized light component and emitted from the half-wave plate 17 are incident on the condensing unit 18. The condensing unit 18 is configured to condense the 90° polarized light component and the 0° polarized light component converted into the 90° polarized light component on a surface of the image capturing element 12.

The image capturing element 12 is one-dimensional image capturing element or a two-dimensional image capturing element. The 90° polarized light component and the 90° polarized light component converted from the 0° polarized light component interfere with each other on the surface of the image capturing element 12, so that an interference fringe corresponding to the specimen 51 to be analyzed is formed on the image capturing element 12. The image capturing element 12 is configured to convert the received interference fringe into a signal and to output the same to the processing unit 13.

The processing unit 13 is configured to obtain spectrum information by performing Fourier transform processing on the received signal, thereby performing component analysis on the specimen 51. In the meantime, the processing unit 13 is configured to store the wavelength λ of the light source 1 and a distance between the condensing unit 18 and the image capturing element 12.

Figure 5:
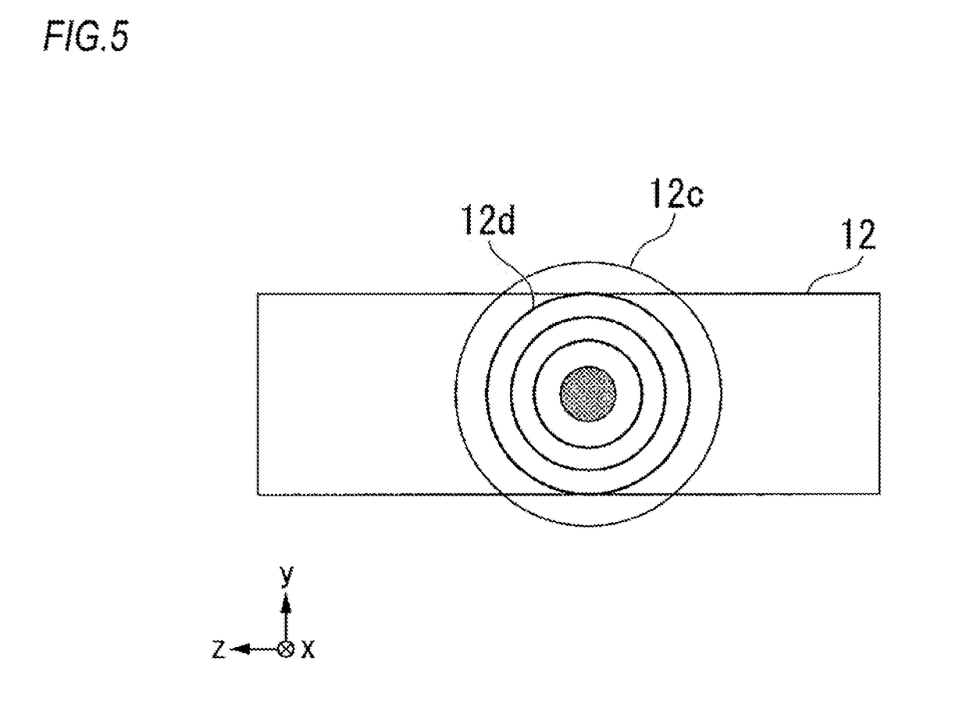
FIG. 5 depicts an example of an interference fringe formed on the image capturing element.

Subsequently, an example of the interference fringe formed on the image capturing element 12 is described.

FIG. 5 depicts an example of the interference fringe formed on the image capturing element 12.

An interference fringe 12*d* as shown in FIG. 5 is formed on the image capturing element 12 by the 90° polarized light component and the 0° polarized light component converted into the 90° polarized light component. In the meantime, a reference sign 12*c* indicates an image of a spot formed on the image capturing element 12.

The interference fringe 12*d* is expressed by a following expression (2).

[Expression 2]

$$g(x,y)=a(x,y)+b(x,y)\cos[2\pi(f_{x0}x+f_{y0}y)+\phi(x,y)] \quad (2)$$

In the expression (2), a(x, y) is a term consisting of a sum of intensities of two light waves, and indicates a background intensity distribution of the interference fringe. b(x, y) indicates an amplitude of change in brightness of the interference fringe. φ(x, y) indicates a phase distribution having information about physical quantities such as a shape, a refractive index distribution and the like of an object to be measured. $f_{x0}$ and $f_{y0}$ are respectively spatial carrier frequencies in x and y directions (unit: numbers/mm).

The image capturing element 12 is configured to output a value of g(x, y) in the expression (2) to the processing unit 13.

Figure 6:
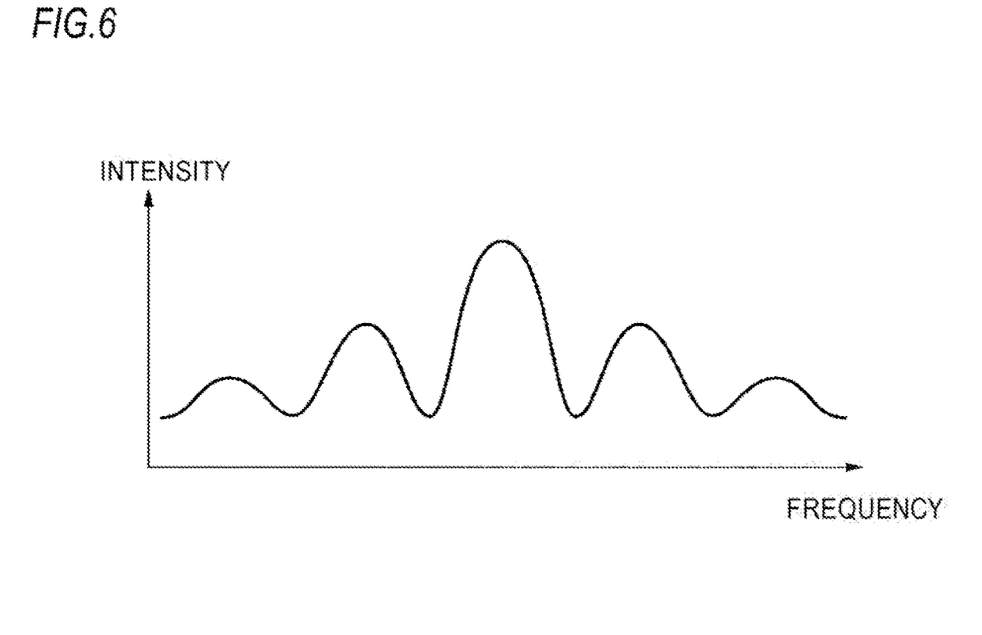
FIG. 6 depicts an example of the interference fringe formed on the image capturing element.

The processing unit 13 is configured to perform two-dimensional Fourier transform on the expression (2). As a result, a two-dimensional spatial frequency spectrum as shown in FIG. 6 is obtained. FIG. 6 depicts an example of the two-dimensional spatial frequency spectrum. In FIG. 6, a horizontal axis indicates frequencies, and a vertical axis indicates intensities.

One spectrum of the two-dimensional spatial frequency spectrum is a complex amplitude of change in brightness of the interference fringe, and represents a Fourier spectrum.

The processing unit 13 is configured to select a spectrum by processing of moving the origin according to the expression (1). and to remove the carrier frequencies $f_{x0}$ and $f_{y0}$. The processing unit 13 is configured to obtain an expression (3) by performing inverse Fourier transform on the basis thereof.

[Expression 3]

$$c(x, y) = \frac{1}{2}b(x, y)\exp[i\phi(x, y)] \quad (3)$$

After obtaining the expression (3), the processing unit 13 takes a complex logarithm of the expression (3). Then, the processing unit 13 is configured to obtain amplitude information of the fringe from a real pan of an expression (4) and to obtain a phase φ(x, y) from an imaginary part. Thereby, the processing unit 13 is configured to perform component analysis on the specimen 51, based on the signal of the obtained interference fringe.

[Expression 4]

$$\log[c(x, y)] = \log\left[\frac{1}{2}b(x, y)\right] + i\phi(x, y) \quad (4)$$

In the meantime, the above processing method is just exemplary, and the present invention is not limited thereto.

Reference; Unique & Exciting Research Visit, No. 09, Takeda Lab, Fourier Transform Method and Its Applications, The University of Electro-Communications [Search on Oct. 23, 2017], Internet <URL:http://www.uec.ac.jp/research/information/column/09.html>

In the above embodiment, the example in which the 0° polarized light component (s-polarized light component) is shifted by 90° by the half-wave plate 17 has been described. However, the 90° polarized light component (p-polarized light component) may be shifted by 90° by the half-wave plate 17. In this case, the light 15*a* of the 0° polarized light component (s-polarized light component) emitted from the polarizing separation element 16 and the light 14*a* of the 90° polarized light component converted into the 0° polarized light component and emitted from the half-wave plate 17 may be made to be incident on the image capturing element 12, via the condensing unit 18.

Meanwhile, in FIG. 4, the polarizing separation element 16, the half-wave plate 17, and the condensing unit 18 may be integrated by bonding or sticking to the same.

Alternatively, air layers may be interposed among the polarizing separation element 16, the half-wave plate 17, and the condensing unit 18.

Even with the second embodiment, it is possible to measure the s-polarized light component and the p-polarized light component at the same time by the configuration of FIG. 4. Thereby, according to the second embodiment, it is possible to cancel the instability (variation in intensity) of the light source. Also, according to the second embodiment, since it is possible to measure the s-polarized light component and the p-polarized light component at the same time, it is possible to perform the measurement more rapidly, as compared to the related art.

Also in the second embodiment, since a moving unit is not provided, unlike the related art, it is possible to make the spectroscopic analysis device 100A smaller than the related art. Also, according to the second embodiment, since a moving unit is not provided, unlike the related art, it is possible to improve robustness, as compared to the related art.

In the above embodiments, as the first polarized light component and the second polarized light component orthogonal to each other, the 0° polarized light component and the 90° polarized light component are used. However, the present invention is not limited thereto. For example, the first polarized light component and the second polarized light component orthogonal to each other may be components of other polarization angles.

In the meantime, a program for implementing the functions of the processing unit 13 of the present invention may be recorded on a computer-readable recording medium, and the processing that is to be executed by the processing unit 13 may be executed by allowing a computer system to read and execute the program recorded on the recording medium. As used herein, the "computer system" includes an OS and hardware such as a peripheral device and the like. Also, the "computer system" includes a WWW system having a webpage providing environment (or display environment). Also, the "computer-readable recording medium" refers to a flexible disk, a magneto-optical disk, a ROM, a portable medium such as a CD-ROM, or a storage device such as a hard disk installed in the computer system. Also, the "computer-readable recording medium" includes a medium that holds a program for a certain period of time, like a volatile memory (RAM) in a computer system that functions as a server or a client in the case in which the program is transmitted via a network such as the Internet or via the communication line such as a telephone line.

Also, the program may be transmitted from a computer system having the program stored in a storage device or the like to another computer system via a transmission medium or by a transmission wave in the transmission medium. Herein, the "transmission medium" for transmitting the program refers to a medium having a function of transmitting information, for example, a network (communication network) such as the Internet, and a communication line (line of communication) such as a telephone line. Also, the program may be one for implementing a part of the aforementioned functions. Also, the program may be one that can implement the aforementioned functions by a combination with the program already recorded on the computer system, which is a so-called differential file (differential program).

Although the present invention has been described with reference to the embodiments, the present invention is not limited to the embodiments, and a variety of changes and replacements can be made without departing from the gist of the present invention.

The subject application is based on Japanese Patent Application No. 2017-217100 filed on Nov. 10, 2017, the contents of which are incorporated herein by reference.

REFERENCE SIGNS LIST

100, 100A spectroscopic analysis device
1 light source
2 light guiding unit
3 collimating unit
5 prism substrate
6 metal thin film
8, 16 polarizing separation element
9 trigonal prism
10 slit
11 wavelength dispersing element
12 image capturing element
13 processing unit
17 wave plate
18 condensing unit

The invention claimed is:

1. A spectroscopic analysis device configured to perform component analysis on a specimen by means of a reflection absorption spectrum of reflected light obtained by irradiating the specimen with light, the spectroscopic analysis device comprising:
   a light source configured to emit light for irradiating the specimen;
   a prism stuck to the specimen and configured to totally reflect the light emitted from the light source;
   a polarizing separation element configured to separate the light totally reflected by the prism into a first polarized light component and a second polarized light component that are orthogonal to each other;
   a wavelength dispersing element configured to disperse respective wavelength components of the first polarized light component and the second polarized light component that are separated by the polarizing separation element;
   an image capturing element configured to capture respective images of the first polarized light component and the second polarized light component that are dispersed by the wavelength dispersing element; and
   a processing unit configured to perform component analysis on the specimen by obtaining an absorbency at each wavelength by using an imaging signal output from the image capturing element.

2. The spectroscopic analysis device according to claim 1, further comprising:
   a trigonal prism between the polarizing separation element and the wavelength dispersing element, and configured to convert the first polarized light component and the second polarized light component that are separated by the polarizing separation element into collimated lights, and
   a slit between the trigonal prism and the wavelength dispersing element, and configured to transmit therethrough components of the collimated lights of the first polarized light component and the second polarized light component that are converted into the collimated lights by the trigonal prism to guide to the wavelength dispersing element.

3. The spectroscopic analysis device according to claim 1, wherein a grating angle of the wavelength dispersing element is set to an angle at which both efficiencies of the first polarized light component and the second polarized light component are to be the same.

4. A spectroscopic analysis device configured to perform component analysis on a specimen by means of a reflection absorption spectrum of reflected light obtained by irradiating the specimen with light, the spectroscopic analysis device comprising:
   a light source configured to emit light for irradiating the specimen;
   a prism stuck to the specimen and configured to totally reflect the light emitted from the light source;
   a polarizing separation element configured to separate the light totally reflected by the prism into a first polarized light component and a second polarized light component orthogonal to each other, the polarizing separation element being a Savart plate having birefringent crystals laminated thereto;
   a wave plate configured to convert one of the first polarized light component and the second polarized light component that are separated by the polarizing separation element into a third polarized light component of which a polarization direction is rotated by 90°;
   an interference unit configured to cause the other of the first polarized light component and the second polarized light component to interfere with the third polarized light component to interfere with each other;
   an image capturing element configured to capture an image of an interference fringe obtained as a result of interference; and
   a processing unit configured to perform component analysis on the specimen by obtaining an absorbency at each wavelength by using an imaging signal output from the image capturing element.

5. The spectroscopic analysis device according to claim 4, wherein the polarizing separation element, the wave plate and interference unit are stuck to each other.

* * * * *